(12) United States Patent
Kelly

(10) Patent No.: US 6,596,963 B2
(45) Date of Patent: Jul. 22, 2003

(54) PRODUCTION AND USE OF WELDING FILLER METAL

(75) Inventor: Thomas Joseph Kelly, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/944,710

(22) Filed: Aug. 31, 2001

(65) Prior Publication Data
US 2003/0042233 A1 Mar. 6, 2003

(51) Int. Cl.$^7$ .............................................. B23K 26/20
(52) U.S. Cl. .................................................. 219/121.64
(58) Field of Search ........................ 219/121.6, 121.63, 219/121.64, 121.85; 164/459, 462, 463, 1

(56) References Cited

U.S. PATENT DOCUMENTS

| 262,625 | A | * | 8/1882 | Small |
| 3,347,959 | A | * | 10/1967 | Engelke et al. |
| 3,765,216 | A | * | 10/1973 | Green |
| 3,985,177 | A | * | 10/1976 | Buehler |
| 4,337,886 | A | | 7/1982 | King et al. |
| 4,624,706 | A | | 11/1986 | Badia |
| 4,794,979 | A | | 1/1989 | Gassner et al. |

FOREIGN PATENT DOCUMENTS

JP 406023485 A * 2/1994

* cited by examiner

Primary Examiner—Samuel M. Heinrich
(74) Attorney, Agent, or Firm—Gregory Garmong; Jonathan P. Miller; McNees Wallace & Nurick LLC

(57) ABSTRACT

A method for welding an article includes producing welding filler metal by the steps of furnishing a powder of a welding-filler-metal composition, preferably a titanium aluminide or a nickel-base superalloy, providing a continuous casting mold having a welding-filler-metal diameter, and melting the powder into a top of the continuous casting mold, while withdrawing a continuous length of the welding filler metal from a bottom of the continuous casting mold. The melting is preferably accomplished using a laser to achieve a concentrated heating zone. The welding filler metal is used to weld an article, by applying an overlay layer or by joining articles together.

30 Claims, 3 Drawing Sheets

PRODUCTION AND USE OF WELDING FILLER METAL

This invention relates to the production and use of welding filler metal and, more particularly, to the continuous production of the welding filler metal.

BACKGROUND OF THE INVENTION

In one type of welding, two or more pieces of metal are heated to their melting points and fused together. Optionally, additional molten metal may be provided as welding filler metal. In another type of welding, the welding filler metal is melted and applied to a face of a substrate as an overlay layer to build up the substrate. This second type of welding is used to repair substrates that have become thinned or damaged during service, or to apply a special facing to the substrate such as a hard facing. In either type of welding, the welding filler metal is melted and fed into the melted region. "Welding filler metal" may be of discrete lengths, which are typically used in manual welding operations, or it may be of continuous lengths used in automated welding machines.

A wide variety of methods are used to manufacture welding filler metal, with drawing or rolling being favored for ductile metals such as steels. The methods that may be used to manufacture welding filler metal of titanium aluminides and nickel-base superalloys are limited by the inability of most of these materials to be drawn, rolled, or swaged.

Instead, in conventional commercial practice the titanium aluminide or nickel-base superalloy to be made into a welding filler metal is cast into a rod about 1 inch in diameter. A number of these rods are placed into an extrusion can, and thereafter extruded to about ¼ inch diameter. The ¼ inch diameter rods are de-canned, cut to length, placed into another extrusion can, and extruded a second time to about 0.06–0.08 inch diameter. This approach is acceptable technically, but it leads to a high cost of the superalloy welding filler metal. About 30 percent or more of the length of each extrusion is lost due to front-end and tail-end extrusion loss, so that the yield of usable welding filler metal from the double-extrusion process is typically less than 50 percent, and often about 25 percent or less, of the weight of the starting material. As a result, the cost of titanium aluminide welding filler metal is sometimes as much as $1500 per pound, and the cost of superalloy welding filler metal is sometimes as much as $700 per pound.

There is a need for an improved approach to the manufacture of an acceptable quality, economically produced welding filler metal of titanium aluminides and nickel-base alloys such as nickel-base superalloys. The present invention fulfills this need, and further provides related advantages.

BRIEF SUMMARY OF THE INVENTION

The present invention provides a technique for producing and using welding filler metal. The production technique involves a single step of continuously casting to size. The welding filler metal is thereby produced economically and in an acceptable quality. The present approach is operable with a wide variety of welding-filler-metal materials, but it is most advantageously used to produce welding filler metal of materials that cannot be drawn, swaged, or rolled.

A method for welding an article comprises the steps of producing welding filler metal by furnishing a powder of a welding-filler-metal composition, providing a continuous casting mold having a welding-filler-metal diameter, and melting the powder into a top of the continuous casting mold, while withdrawing a continuous length of the welding filler metal in a solid form from a bottom of the continuous casting mold. The welding filler metal may thereafter be used to weld an article by applying a weld overlay layer to a substrate or by joining two articles together using the welding filler metal.

The step of furnishing preferably includes the step of furnishing a powder of a titanium aluminide or a nickel-base superalloy. The continuous casting mold is desirably a water-jacketed continuous casting mold, and desirably has an inner diameter of from about 0.050 inch to about 0.080 inch.

The melting of the powder is preferably accomplished using a laser beam. The laser melting allows the powder to be melted quickly and in a small volume at the top of the casting mold, minimizing oxidation or other damage to the powder prior to its melting and consolidation in the casting mold.

The present approach is most advantageously used to make welding filler metal of materials that must otherwise be made into welding filler metal by casting and multistage extrusion. The conventional weld-rod fabrication technology for these materials significantly increases the cost of the final welding filler metal due to the multiple fabrication stages and the loss of material as scrap during the fabrication operations. The present approach requires the use of the welding filler metal starting material in relatively finely divided form, such as a powder. The remainder of the processing is accomplished relatively inexpensively and in a single continuous melting-and-casting operation. The net cost of preparing welding filler metal by the present approach is significantly less, and estimated to be ¼ or less, of the cost of producing welding filler metal by the conventional casting-and-multistage-extrusion approach. The welding filler metal produced by the present approach is of sufficient relative density and mechanical properties in the as-cast-rod form that it may be used in either manual or continuous welding operations.

Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
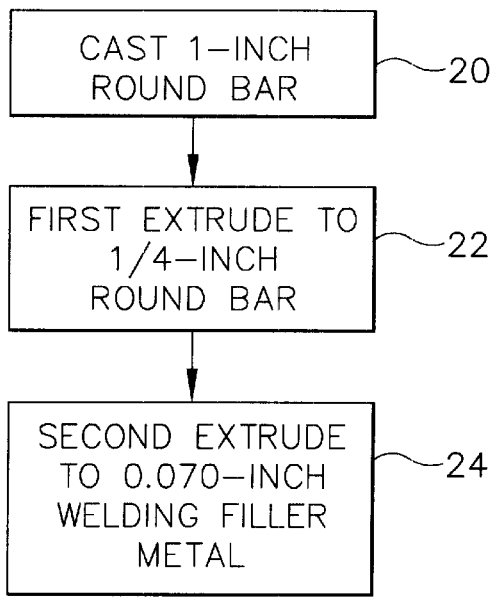
FIG. 1 is a block diagram of a prior approach for preparing welding filler metal of nickel-base superalloys.

FIG. 1 depicts a prior approach for preparing welding filler metal of a welding-filler-metal material such as a titanium aluminide or a nickel-base superalloy in a standard size of about 0.070 inch diameter. A one-inch round bar of the welding-filler-metal material is cast, numeral 20. This bar is extruded to about ¼ inch diameter in a first extrusion operation, numeral 22. In performing this first extrusion, a number of the one-inch diameter bars are bundled together inside a steel extrusion can which is welded shut. The extrusion can and the contained bars are extruded with a 16:1 areal extrusion ratio. After extrusion, the can is removed from the resulting ¼ inch diameter rods. The rods are cleaned, and a number of the ¼-inch diameter rods are repackaged in another steel extrusion can and second extruded, numeral 24, with an extrusion ratio such that the rods are about 0.070 inch in diameter after subsequent removal from the extrusion can. Each extrusion process has a scrap loss of unusable material at the front end and the tail end totaling 30 percent of the weight of the material introduced into the respective extrusion process. In commercial practice the net process yield is typically 25–50 percent of the total weight that is first cast in step 20. Titanium aluminides and superalloys have a high material cost, and this low yield of good welding filler metal results in a net cost of as much as $700–$1500 per pound of usable welding filler metal.

Figure 2:
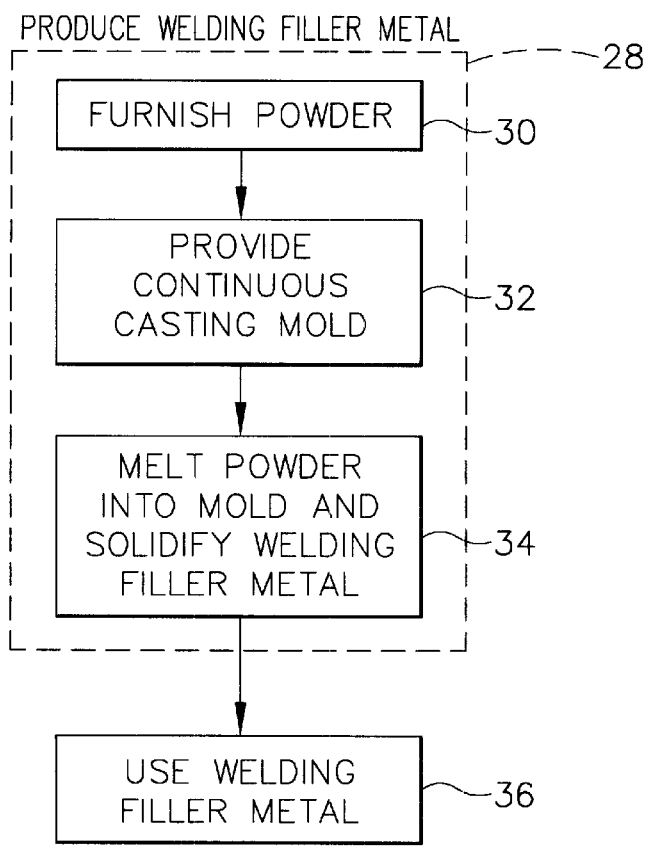
FIG. 2 is a block diagram of the present approach for preparing welding filler metal of nickel-base superalloys.

By contrast, FIG. 2 illustrates the present approach. The welding filler metal is first produced, numeral 28. ("Welding filler metal" is also sometimes termed "weld rod" or "weld wire" in the art.) To produce the welding filler metal, a welding-filler-metal material, preferably a titanium aluminide or a nickel-base alloy (such as a nickel-base superalloy), is furnished, numeral 30. A "titanium aluminide" comprises primarily titanium and aluminum, with other elements such as niobium optionally present in lesser amounts. The titanum and aluminum are typically present in atomic percentages of from about 45.5 to about 48.0 percent aluminum and from about 48 to about 50.5 percent titanium, with the balance other elements.

As used herein, "nickel-base" means that the composition of the alloy has more nickel present than any other element. The nickel-base superalloys are typically of a composition that is strengthened by the precipitation of gamma-prime phase or a related phase. The nickel-base superalloy alloy typically has a composition, in weight percent, of from about 4 to about 20 percent cobalt, from about 1 to about 15 percent chromium, from about 4 to about 7 percent aluminum, from 0 to about 10 percent molybdenum, from about 3 to about 8 percent tungsten, from about 4 to about 12 percent tantalum, from 0 to about 3 percent titanium, from 0 to about 8 percent rhenium, from 0 to about 6 percent ruthenium, from 0 to about 5 percent niobium, from 0 to about 0.1 percent carbon, from 0 to about 0.01 percent boron, from 0 to about 0.1 percent yttrium, from 0 to about 1.5 percent hafnium, balance nickel and incidental impurities. Specific examples of nickel-base superalloys with which the present invention is operable are Rene 142, having a nominal composition, in weight percent, of about 12 percent cobalt, about 6.8 percent chromium, about 1.5 percent molybdenum, about 4.9 percent tungsten, about 6.4 percent tantalum, about 6.2 percent aluminum, about 2.8 percent rhenium, about 1.5 percent hafnium, about 0.1 percent carbon, about 0.015 percent boron, balance nickel and incidental impurities; and Rene 195, having a nominal composition, in weight percent, of from about 7.4 to about 7.8 percent chromium, from about 5.3 to about 5.6 percent tantalum, from about 2.9 to about 3.3 percent cobalt, from about 7.6 to about 8.0 percent aluminum, from about 0.12 to about 0.18 percent hafnium, from about 0.5 to about 0.6 percent silicon, from about 3.7 to about 4.0 percent tungsten, from about 1.5 to about 1.8 percent rhenium, from about 0.01 to about 0.03 percent carbon, from about 0.01 to about 0.02 percent boron, balance nickel and incidental impurities. The present approach is not limited to these nickel-base superalloys, which are presented only as examples of operable compositions which are desirably made into welding filler metal.

The material of the welding filler metal is preferably furnished as a powder, although other finely divided and non-finely divided forms are operable. The dimensions of the powder particles are not critical, but would typically be about 325 mesh. The material of the welding filler metal may instead be furnished as bar stock or in other undivided form, although the production of bar stock is difficult for most titanium aluminides and superalloys and therefore the use of powder is preferred.

Figure 3:
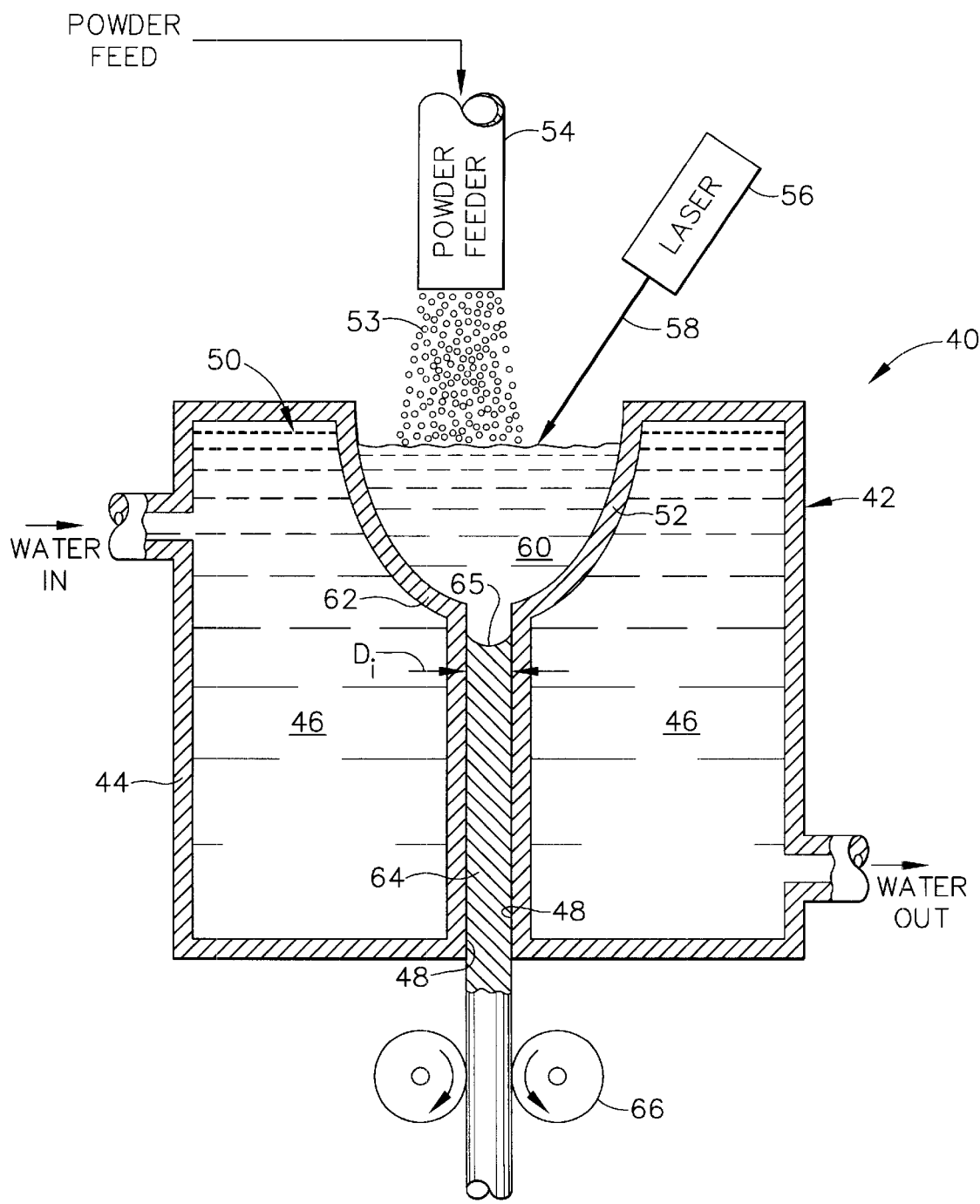
FIG. 3 is a schematic sectional view of a continuous casting mold during the melting-and-casting operation.

A continuous-casting mold is provided, numeral 32. FIG. 3 illustrates such a continuous-casting mold 40. The continuous-casting mold 40 includes a mold body 42 in the form of a hollow metallic water jacket 44 which, in operation, is filled with a flow of cooling water 46. The continuous-casting mold 40 includes an interior bore 48 having a cross-sectional shape as desired in the final welding filler metal. Preferably, the interior bore 48 is a cylinder having a cylindrical welding-filler-metal diameter $D_i$ of from about 0.050 to about 0.080, most preferably about 0.070, inch. These dimensions are not critical or limiting of the invention, and are presented here to illustrate common welding-filler-metal diameters. At a top 50 of the mold 40, the interior bore 48 enlarges in diameter to define a crucible 52 in which molten metal is melted. The crucible 52 may have the same metallic wall construction as the remainder of the mold 40. Alternatively, the crucible 52 portion of the mold 40 may be made of, or coated with, an insulating material such as a ceramic to reduce the rate of heat loss through the walls of the crucible 52 into the water 46 within the water jacket 44.

The welding-filler-metal material is melted into the mold 40 and continuously solidified to produce welding filler metal, numeral 34 of FIG. 2. In the case of the preferred powder welding-filler-metal material, the welding-filler-metal material powder 53 is fed continuously or semi-continuously from a powder feeder 54 into the crucible 52. The material in the crucible is heated by a suitable power source, preferably a high-power laser 56. Other power sources may be used, such as induction or resistance heaters, with an appropriate design of the crucible 52. A laser beam 58 from the laser 56 is directed into the crucible 52, with a beam power intensity such that the powder 53 is melted to form a molten pool 60.

As molten welding-filler-metal material in the molten pool 60 moves downwardly toward a bottom 62 of the crucible 52, it is gradually cooled because the walls of the crucible 52 converge to be continuous with the interior bore 48. At a solidification front 65 just into the interior bore 48 from the crucible 52, the molten welding-filler-metal material solidifies to form the welding filler metal 64 within the interior bore 48. The axial location of the solidification front 65 within the interior bore 48 may be controlled by adjusting the power input of the laser 56 and the flow of cooling water 46. A drive mechanism 66 moves the solidified welding filler metal 64 downwardly out of a bottom 68 of the mold 40 and out of the mold 40. The solidified welding filler metal 64 may be cut to short lengths, or coiled to form a semi-continuous length, as desired for the type of welding process with which it is to be used.

The production of the welding filler metal 64 is complete. The welding filler metal has a condensed metal structure approaching one hundred percent relative density. That is, there is a relatively small amount of porosity in the welding filler metal. A small amount of porosity is acceptable, inasmuch as the welding filler metal is to be subsequently melted in the welding process described next. The welding filler metal is generally homogeneous in composition across the diameter and along its length, although some variation in each dimension is acceptable. The diameter of the welding filler metal is defined by the diameter of the interior bore 48.

Figure 4:
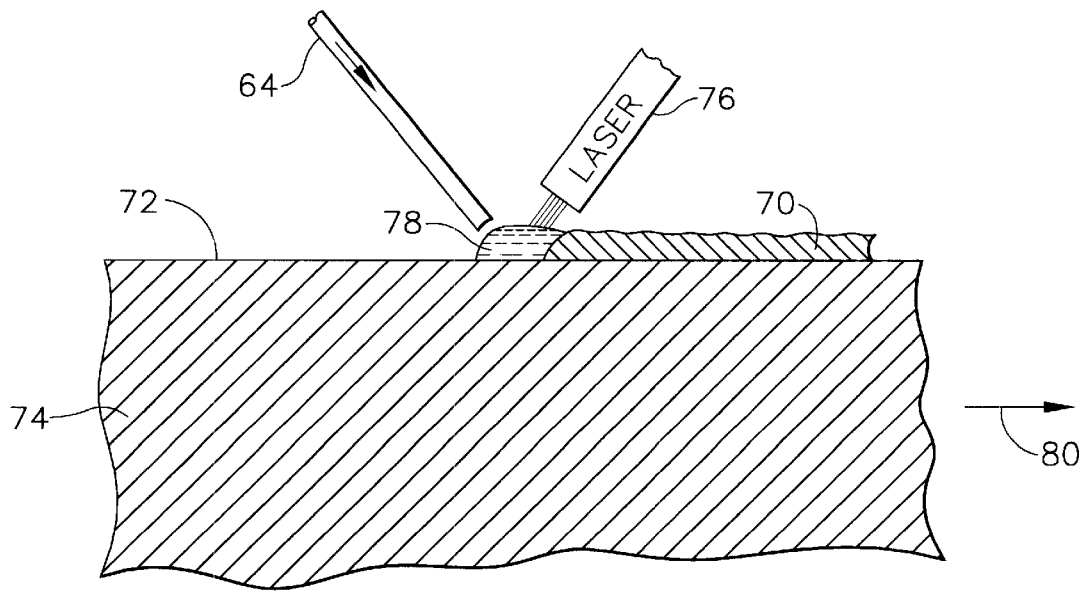
FIG. 4 is a schematic elevational view of using the welding filler metal to apply an overlay layer to a substrate.
Figure 5:
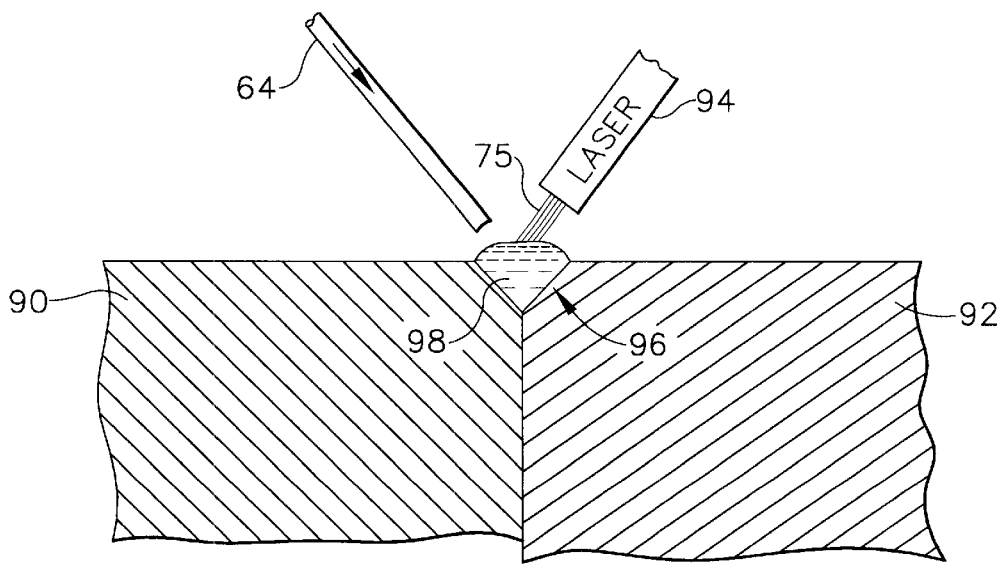
FIG. 5 is a schematic elevational view of using the welding filler metal to weld two articles together.

The welding filler metal is used to perform a welding operation on an article, numeral 36. FIGS. 4–5 illustrate two types of welding operations. In the approach of FIG. 4, a weld overlay layer 70 is deposited upon a surface 72 of a substrate 74. A heat source of any operable type, but here illustrated as a laser beam 75 produced by a laser 76, is directed against the surface 72. A continuous feed of the welding filler metal 64 is provided as the material of the overlay layer 70. The laser beam 75 heats the surface 72 and the portion of the welding filler metal 64 resting upon the surface 72 to form a molten pool 78. The substrate 74 and the welding filler metal 64/laser 76 are moved relative to each other, as indicated by the arrow 80. As the molten pool 78 moves away from the laser 76, it cools to form the weld overlay layer 70. Other types of heat sources, such as a gas tungsten arc (GTA) heat source may also be used.

In the approach of FIG. 5, the welding filler metal 64 is used as a filler material to join two articles 90 and 92 together. A laser 94 heats a joint region 96 to form a molten pool 98, and the welding filler metal 64 is fed into the molten pool 98. The articles 90/92 and the welding filler metal 64/laser 94 move relative to each other, in this case in a direction perpendicular to the plane of the page of the illustration. The molten pool 98 solidifies as it moves away from the laser 94, to form a solid weld joint that joins the two articles 90 and 92.

The reduction in cost of the welding filler metal made by the present approach, as compared with the prior art approach, significantly reduces the total cost of the welding operations.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A method for welding an article, the method including producing welding filler metal by the steps of
   furnishing a welding-filler-metal composition selected from the group consisting of a titanium aluminide and a nickel-base superalloy;
   providing a continuous casting mold having a welding-filler-metal diameter; and thereafter
   melting the welding-filler-metal composition into a top of the continuous casting mold, while withdrawing a continuous length of the welding filler metal in a solid form from a bottom of the continuous casting mold.

2. The method of claim 1, wherein the step of furnishing includes the step of
   furnishing the welding-filler-metal composition in a powder form.

3. The method of claim 1, wherein the step of furnishing includes the step of
   furnishing a titanium aluminide.

4. The method of claim 1, wherein the step of furnishing includes the step of
   furnishing a nickel-base superalloy.

5. The method of claim 1, wherein the step of providing includes the step of
   providing a water-jacketed continuous casting mold.

6. The method of claim 1, wherein the step of melting includes the step of
   melting the welding-filler-metal composition using a laser beam.

7. The method of claim 1, wherein the step of providing a continuous casting mold includes the step of
   providing the continuous casting mold having the welding-filler-metal diameter of from about 0.050 inch to about 0.080 inch.

8. The method of claim 1, including an additional step, after the step of melting, of
   welding an article using the welding filler metal.

9. A method for welding an article, comprising the steps of
   producing welding filler metal, the step of producing including the steps of
      furnishing a powder of a welding-filler-metal composition,
      providing a water-jacketed continuous casting mold having a welding-filler-metal diameter, and
      melting the powder into a top of the continuous casting mold, while withdrawing a continuous length of the welding filler metal from a bottom of the continuous casting mold; and
   using the welding filler metal to weld an article.

10. The method of claim 9, wherein the step of furnishing includes the step of
    furnishing a powder of a titanium aluminide.

11. The method of claim 9, wherein the step of furnishing includes the step of
    furnishing a powder of a nickel-base superalloy.

12. The method of claim 9, wherein the step of using includes the step of
    joining two articles together using the welding filler metal.

13. The method of claim 9, wherein the step of melting includes the step of
    melting the powder using a laser beam.

14. The method of claim 9, wherein the step of providing a continuous casting mold includes the step of
    providing the continuous casting mold having the welding-filler-metal diameter of from about 0.050 inch to about 0.080 inch.

15. The method of claim 9, wherein the step of using includes the step of
    applying a weld overlay layer to a substrate using the welding filler metal.

16. A method for welding an article, the method including producing welding filler metal by the steps of
    furnishing a welding-filler-metal composition in a powder form;
    providing a continuous casting mold having a welding-filler-metal diameter; and thereafter
    melting the welding-filler-metal composition into a top of the continuous casting mold, while withdrawing a continuous length of the welding filler metal in a solid form from a bottom of the continuous casting mold.

17. The method of claim 16, wherein the step of furnishing includes the step of
    furnishing the welding-filler-metal composition selected from the group consisting of a titanium aluminide and a nickel-base superalloy.

18. A method for welding an article, the method including producing welding filler metal by the steps of furnishing a welding-filler-metal composition;

providing a water-jacketed continuous casting mold having a welding-filler-metal diameter; and thereafter melting the welding-filler-metal composition into a top of the continuous casting mold, while withdrawing a continuous length of the welding filler metal in a solid form from a bottom of the continuous casting mold.

19. The method of claim 18, wherein the step of furnishing includes the step of furnishing the welding-filler-metal composition selected from the group consisting of a titanium aluminide and a nickel-base superalloy.

20. A method for welding an article, the method including producing welding filler metal by the steps of furnishing a welding-filler-metal composition;

providing a continuous casting mold having a welding-filler-metal diameter; and thereafter melting the welding-filler-metal composition, using a laser beam, into a top of the continuous casting mold, while withdrawing a continuous length of the welding filler metal in a solid form from a bottom of the continuous casting mold.

21. The method of claim 20, wherein the step of furnishing includes the step of furnishing the welding-filler-metal composition selected from the group consisting of a titanium aluminide and a nickel-base superalloy.

22. A method for welding an article, the method including producing welding filler metal by the steps of furnishing a welding-filler-metal composition;

providing a continuous casting mold having a welding-filler-metal diameter of from about 0.050 inch to about 0.080 inch; and thereafter melting the welding-filler-metal composition into a top of the continuous casting mold, while withdrawing a continuous length of the welding filler metal in a solid form from a bottom of the continuous casting mold.

23. The method of claim 22, wherein the step of furnishing includes the step of furnishing the welding-filler-metal composition selected from the group consisting of a titanium aluminide and a nickel-base superalloy.

24. A method for welding an article, comprising the steps of producing welding filler metal, the step of producing including the steps of furnishing a powder of a welding-filler-metal composition selected from the group consisting of a titanium aluminide and a nickel-base superalloy, providing a continuous casting mold having a welding-filler-metal diameter, and melting the powder into a top of the continuous casting mold, while withdrawing a continuous length of the welding filler metal from a bottom of the continuous casting mold; and using the welding filler metal to weld an article.

25. The method of claim 24, wherein the step of furnishing includes the step of furnishing a powder of a titanium aluminide.

26. The method of claim 24, wherein the step of furnishing includes the step of furnishing a powder of a nickel-base superalloy.

27. A method for welding an article, comprising the steps of producing welding filler metal, the step of producing including the steps of furnishing a powder of a welding-filler-metal composition, providing a continuous casting mold having a welding-filler-metal diameter, and melting the powder, using a laser beam, into a top of the continuous casting mold, while withdrawing a continuous length of the welding filler metal from a bottom of the continuous casting mold; and using the welding filler metal to weld an article.

28. The method of claim 27, wherein the step of furnishing includes the step of furnishing the welding-filler-metal composition selected from the group consisting of a titanium aluminide and a nickel-base superalloy.

29. A method for welding an article, comprising the steps of producing welding filler metal, the step of producing including the steps of furnishing a powder of a welding-filler-metal composition, providing a continuous casting mold having a welding-filler-metal diameter of from about 0.050 inch to about 0.080 inch, and melting the powder into a top of the continuous casting mold, while withdrawing a continuous length of the welding filler metal from a bottom of the continuous casting mold; and using the welding filler metal to weld an article.

30. The method of claim 29, wherein the step of furnishing includes the step of furnishing the welding-filler-metal composition selected from the group consisting of a titanium aluminide and a nickel-base superalloy.

* * * * *